(12) United States Patent
Farrar

(10) Patent No.: US 6,275,396 B1
(45) Date of Patent: Aug. 14, 2001

(54) POWER FEED FOR A SUBMARINE COMMUNICATIONS SYSTEM

(75) Inventor: Anthony John Farrar, Bexley (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/404,439

(22) Filed: Sep. 22, 1999

(30) Foreign Application Priority Data

Sep. 22, 1998 (GB) .................................................. 9820643

(51) Int. Cl.⁷ .................................................. H02M 7/00
(52) U.S. Cl. .................................................. 363/65; 363/68
(58) Field of Search ............................... 363/65, 67, 68, 363/69, 70, 71; 307/71

(56) References Cited

U.S. PATENT DOCUMENTS

| | | | |
|---|---|---|---|
| 4,012,617 | * | 3/1977 | Burke et al. .......................... 219/716 |
| 4,039,924 | * | 8/1977 | Scales et al. ........................... 363/65 |
| 4,222,099 | * | 9/1980 | Hill ..................................... 363/101 |
| 4,967,333 | | 10/1990 | Callier et al. .......................... 363/17 |
| 5,272,612 | * | 12/1993 | Harada et al. ...................... 363/65 X |
| 5,465,010 | | 11/1995 | Rimmer .................................. 307/9.1 |

FOREIGN PATENT DOCUMENTS

| | | |
|---|---|---|
| 997706 | 7/1965 | (GB) . |
| 1036565 | 7/1966 | (GB) . |
| 1132208 | 10/1968 | (GB) . |
| 1 510 084 | 5/1978 | (GB) . |
| 1 543 153 | 3/1979 | (GB) . |
| 2 217 931 A | 11/1989 | (GB) . |
| 2-202324A | 10/1990 | (JP) . |

\* cited by examiner

Primary Examiner—Jessica Han
(74) Attorney, Agent, or Firm—Sughrue, Mion, Zinn, Macpeak & Seas, PLLC

(57) ABSTRACT

A power feed for a submarine communications system includes a plurality of power converters each of which has at least 2 step-up transformer stages in which at least one of the windings of at least one of the transformer stages of at least one of the plurality of power converters is wound using a high voltage insulating wire to insulate against a high DC voltage appearing at an output of an adjacent power converter. The use of high voltage insulating wire removes the need for expensive custom built DC blocking capacitors.

9 Claims, 3 Drawing Sheets

POWER FEED FOR A SUBMARINE COMMUNICATIONS SYSTEM

BACKGROUND OF THE INVENTION

Power feed equipment is required to provide electrical power to the cables of submarine communications systems. An example of a conventional power feed is shown schematically in FIG. 1. The power feed 1 is constructed using a stack of four identical power converters $2_1$ to $2_4$ connected in series which together convert a 50V DC supply at the input terminals of the power feed to provide a 10 kV DC power feed voltage across the output terminals. The first power converter $2_1$ in the stack provides a 2.5 kV DC output, but it is elevated from earth by an additional 7.5 kV DC due to the effect of the adjacent power converters $2_2$ to $2_4$ in the stack. The centre-tapped transformer secondary winding 3 of the transformer 4 in the first power converter $2_1$ must therefore be insulated to 10 kV DC from earth to prevent Corona discharge and ultimately flash-over. Accordingly, blocking capacitors 5 and 6 are provided in this circuit which are designed to block the high DC voltage relative to earth and thereby insulate the secondary winding. Due to the magnitude of the DC voltage, the required blocking capacitors are large, bulky and expensive, and are not available as off-the-shelf components. Indeed, each capacitor typically has a capacitance of 0.5 $\mu F$ and a DC voltage breakdown greater than 15 kV. The use of such components is clearly undesirable.

Furthermore, although typically a nominal 2.5 kV DC output is produced by each power converter the corresponding AC pulse voltage from the high voltage secondary winding 3 is about 4 kV to allow for pulse width voltage control. Accordingly, rectifying and smoothing circuits 7 associated with each power converter must be designed and built using electrical components which can withstand these high AC voltages. Again, as with the DC blocking capacitors, such components are expensive and not generally available off-the-shelf.

SUMMARY OF THE INVENTION

According to a first aspect of the present invention, a power feed for a submarine communications system comprises a plurality of power converters connected together in series to convert a low voltage received at an input to the power feed to a high voltage at an output of the power feed, in which each power converter has at least two step-up transformer stages, and wherein at least one of the windings of the or each transformer in at least one of the transformer stages of at least one of the plurality of power converters is wound using a high voltage insulating wire to insulate against a DC voltage appearing at an output of an adjacent power converter.

According to a second aspect of the present invention, a power converter for a power feed for a submarine communications system comprises at least two step-up transformer stages, wherein at least one of the windings of the or each transformer in at least one of the transformer stages is wound using a high voltage insulating wire.

In the present invention, high voltage insulating wire is used to insulate against a DC voltage associated with the stacking and series connection of power converters. High voltage insulating wire has a relatively large diameter and so there is a restriction on the number of turns which can fit into the available space of the conventional transformer design described above without increasing the size of the transformer core, which is undesirable. As the output voltage of a transformer depends directly on the ratio of number of turns of wire on the primary and secondary windings, the limited availability of space on the secondary makes it impossible to achieve the required voltage step-up with a single transformer stage. To overcome this, in the present invention one or more additional transformer stages are included, thereby reducing the turns ratio required for each individual transformer. Accordingly, there is no need for any components to block the DC potential associated with adjacent power converters in the stack since the high voltage insulating wire used, for example, to provide the secondary winding of the transformer in the first transformer stage, provides this function.

Preferably, the step-up transformer stages are connected sequentially in series. Each of the transformers may be connected in series. However, preferably, the transformers are cascaded together to form a tree structure with the outputs of end branches of the tree structure connected in series to provide a combined voltage output at the terminals of the power converter. More preferably, each end branch of the tree structure comprises an AC rectifying circuit to provide a DC electrical output. In this manner, each end branch of the tree structure provides a proportion of the total output of the power converter and the output of each end branch is processed separately by a respective rectifying and smoothing circuit. As such, the AC voltages processed by each end branch are correspondingly smaller and so custom built components are not required in the individual rectifying and smoothing circuits.

Preferably, the power converter comprises a first transformer stage having a transformer in which the secondary winding of the transformer is wound from high voltage insulating wire. More preferably, the power converter further comprises a printed circuit board supporting a second and any subsequent transformner stages. Most preferably, the or each transformer on the printed circuit board comprises a planar ferrite core.

BRIEF DESCRIPTION OF THE DRAWINGS

An example of the present invention will now be described in detail below with reference to the accompanying drawings, in which.

DETAILED DESCRIPTION

Figure 2:
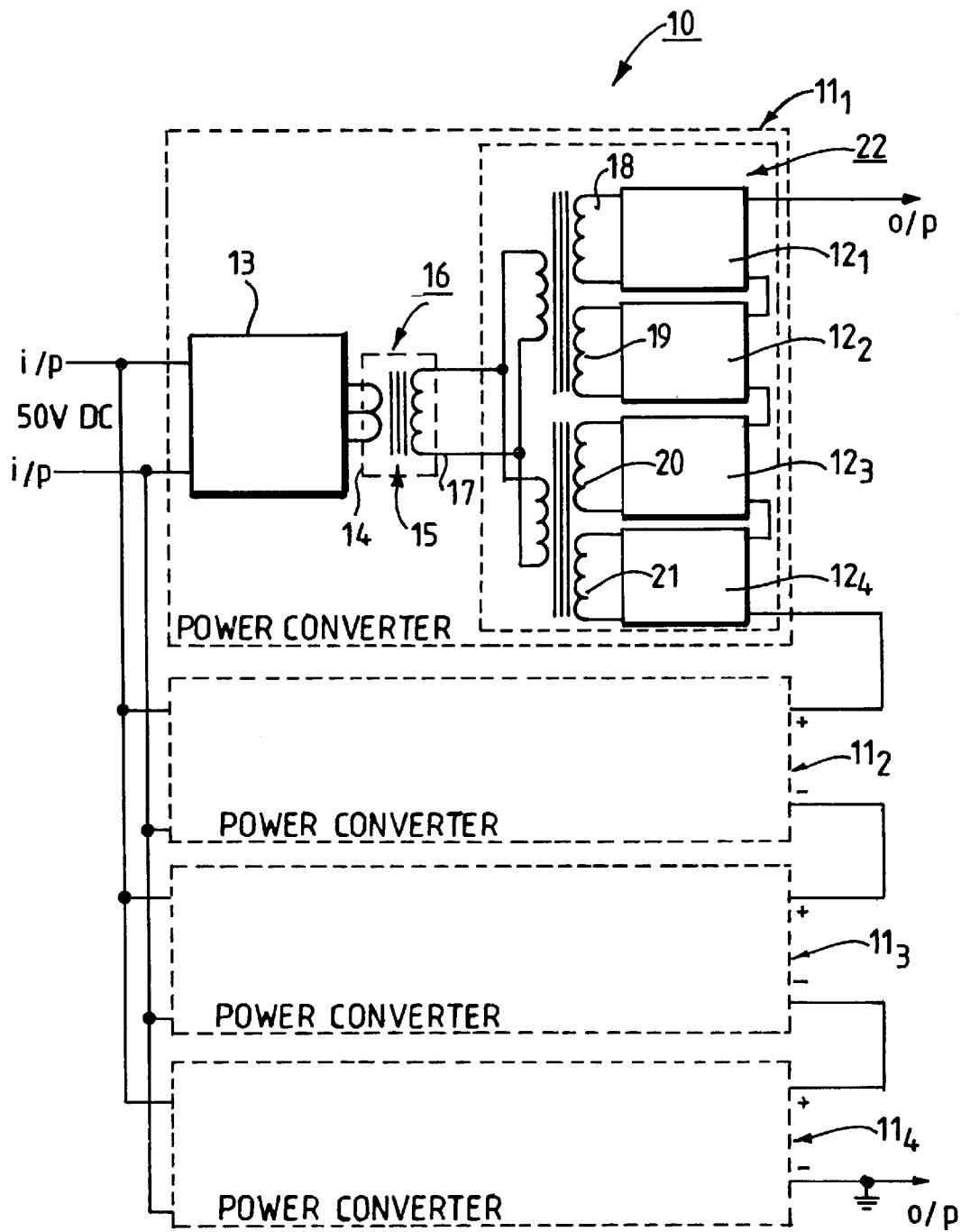
FIG. 2 shows a schematic representation of a power feed according to the present invention; and, FIG. 3 shows a simplified circuit diagram of a rectifying and smoothing circuit for use in a power converter.

The power feed 10 shown in FIG. 2 has four power converters $11_1$ to $11_4$ connected in series. As shown for the first power converter 11, the transformers in each power converter are connected to form a cascaded tree structure in which the end branches are provided with a respective rectifying and smoothing circuit $12_1$ to $12_4$. Each power converter has a low voltage pushpull power switching circuit 13 alternately connecting a positive and negative 50 V DC supply from a control circuit (not shown) to the primary winding 14 of a low voltage transformer 15 in a first step-up transformer stage 16. The secondary winding 17 of the low voltage transformer 15 is wound from high voltage insulating wire, the effect of which is to block the high DC potential caused by the series coupling of the adjacent power converters in the stack. The use of high voltage insulating wire means that there is no need for the inclusion of large custom built DC blocking capacitors in each of the power converter circuits $11_1$ to $11_4$.

An example of high voltage insulating wire that could be used in the power feed according to the present invention is extruded FEP insulated high voltage cable. This cable provides substantial dielectric strength without the disadvantages of the large diameters common to equally rated silicone rubber insulated cables. As a result, cable assemblies or cable bundles are of smaller diameter and therefore take up substantially less volume. Furthermore since they are of smaller bend radius it is possible to make more efficient use of space within the power feed. The high voltage insulating wire has good corona inception qualities and its construction gives it durability and resistance to dielectric degradation. An example of a cable which may be used is that manufactured by Reynolds Industries Limited—High Voltage Products Division, sold under their part number 178-9161.

The output from the low voltage transformer 15 is split and coupled directly to the parallel-connected primary windings of a set of high voltage step-up transformers 18 to 21 in a second step-up transformer stage 22. In this example, each one of the high voltage step-up transformers' primary windings has two associated secondary windings each of which is provided with a respective rectifying and smoothing circuit $12_1$ to $12_4$ to provide a DC output. The high voltage step-up transformers and rectifying and smoothing circuits $12_1$ and $12_4$ are all arranged on a PCB substrate (not shown). The step-up transformers in the second step-up transformer stage 22 are implemented using planar ferrite cores with spiral copper tracks as windings in multiple layers on the PCB. The high voltage part of each power converter can be arranged completely on a PCB and as such, there is no need for a manufacturing process using expensive custom-built components.

Figure 1:
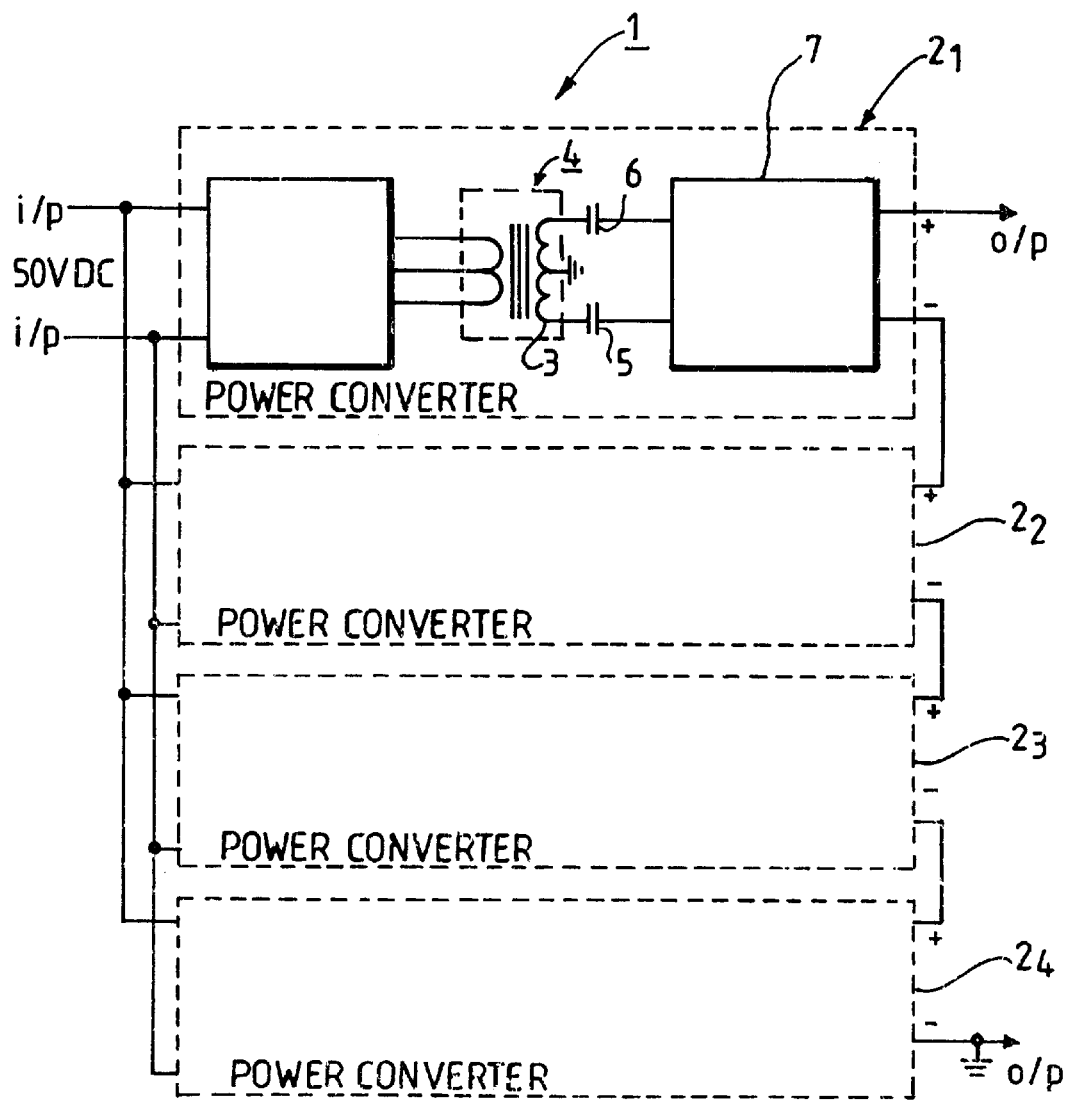
FIG. 1 shows a schematic representation of a conventional power feed.
Figure 3:
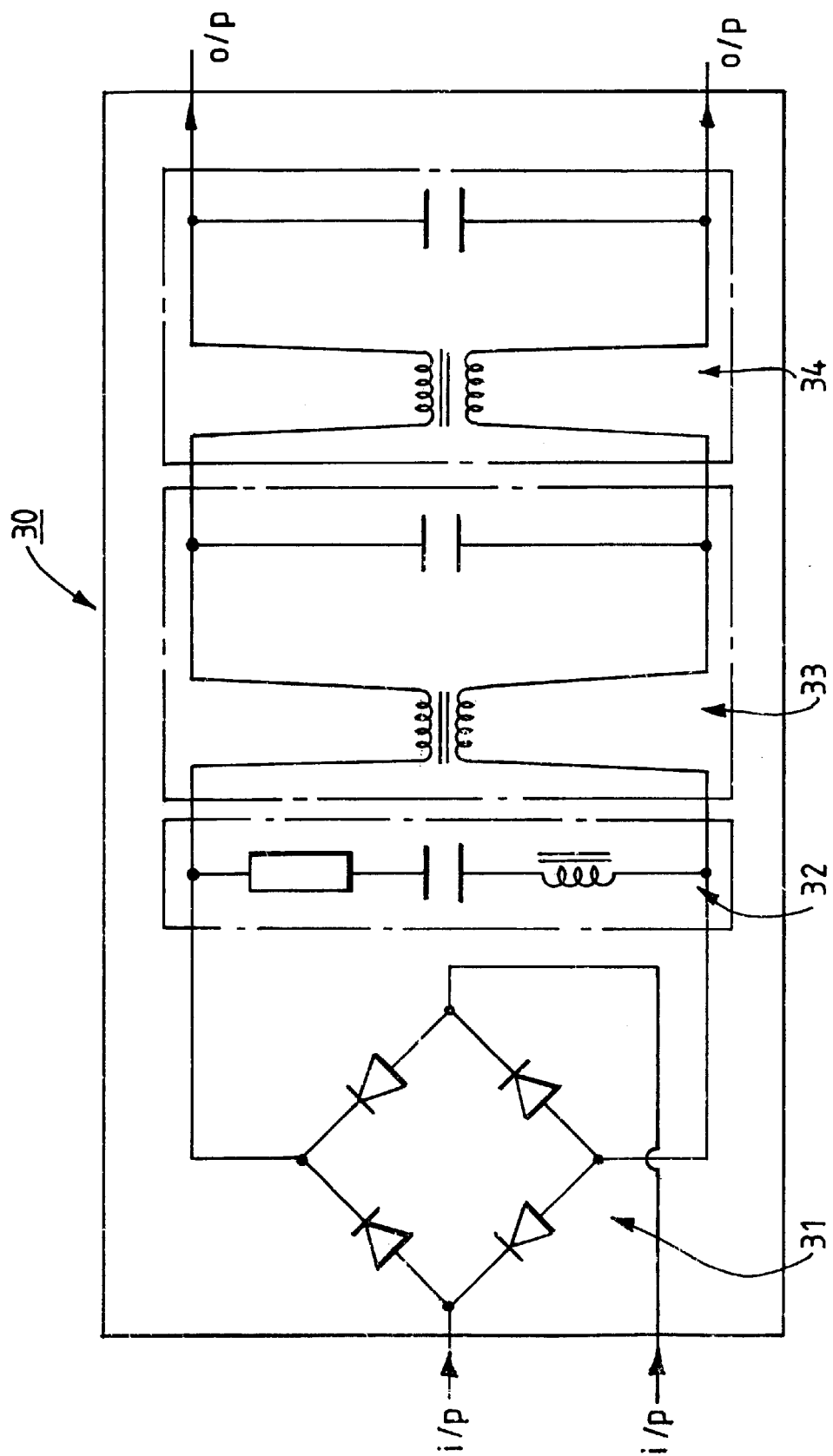

FIG. 3 shows a simplified circuit diagram of a rectifying a smoothing circuit 30 for use in the power feed of FIG. 2. The circuit 30 has a bridge rectifier 31, a snubber 32 and two smoothing chokes 33 and 34 connected in series. The bridge rectifier 31 converts the AC output of the secondary winding in the end branch of the tree structure into a DC voltage. The snubber 32 acts to remove ringing due to stray inductance and capacitance in the circuit. Finally, the DC voltage is smoothed by the pair of chokes 33 and 34 and then coupled to the power converter output. Since each of the secondary windings in the end branches have their own associated rectifying and smoothing circuit 30 the AC pulse voltage that each circuit has to handle will be approximately 1 kV instead of 4 kV. As such, expensive custom built components are not required for the circuitry of the rectifying a smoothing circuit 30 and all the components are readily incorporated onto a PCB. The four identical rectifying and smoothing circuits of the power converter are connected in series to provide a total DC voltage output equivalent to that produced by a conventional power converter described above with reference to FIG. 1.

What is claimed is:

1. A power feed for a submarine communications system, comprising a plurality of power converters connected together in series to convert a low voltage received at an input to the power feed to a high voltage at an output of the power feed, in which each power converter has at least two step-up transformer stages and wherein at least one of the secondaries of the windings of the or each transformer in at least one of the first transformer stages of at least one of the plurality of power converters is a primary of a second of the transformer stages and is wound using a high voltage insulating wire.

2. A power feed according to claim 1, in which the step-up transformer stages are connected sequentially in series.

3. A power feed according to claim 1, in which the transformers are cascaded to form a tree structure with the outputs of end branches of the tree structure connected in series to provide a combined voltage output at the terminals of the power converter.

4. A power feed according to claim 3, in which each end branch of the tree structure comprises an AC rectifying circuit to provide a DC electrical output.

5. A power feed according to claim 1, in which the at least one power converter further comprises a printed circuit board supporting a second and any subsequent transformer stages.

6. A power converter according to claim 1, in which the at least two step-up transformer stages are cascaded together to form a tree structure with the outputs of end branches of the tree structure connected in series to provide a combined voltage output.

7. A power convertor according to claim 6, in which each end branch of the tree structure comprises an AC rectifying circuit to provide a DC electrical output.

8. A power converter according to claim 6, further comprising a printed circuit board supporting a second and any subsequent transformer stages.

9. A power converter according to claim 8, in which the or each transformer on the printed circuit board comprises a planar ferrite core.

* * * * *